(12) United States Patent
Terada et al.

(10) Patent No.: US 8,684,129 B2
(45) Date of Patent: Apr. 1, 2014

(54) ELECTRIC POWER STEERING SYSTEM

(75) Inventors: Shinsuke Terada, Ikoma (JP); Hideki Higashira, Ikoma (JP); Yasuyuki Yoshii, Souraku-gun (JP); Naoki Maeda, Kashihara (JP); Shirou Nakano, Minamikawachi-gun (JP)

(73) Assignee: JTEKT Corporation, Osaka-shi (JP)

( * ) Notice: Subject to any disclaimer, the term of this patent is extended or adjusted under 35 U.S.C. 154(b) by 13 days.

(21) Appl. No.: 13/380,196

(22) PCT Filed: Jun. 21, 2010

(86) PCT No.: PCT/JP2010/060474
§ 371 (c)(1),
(2), (4) Date: Dec. 22, 2011

(87) PCT Pub. No.: WO2010/150746
PCT Pub. Date: Dec. 29, 2010

(65) Prior Publication Data
US 2012/0090913 A1 Apr. 19, 2012

(30) Foreign Application Priority Data

Jun. 25, 2009 (JP) ................................. 2009-151153
May 28, 2010 (JP) ................................. 2010-123070

(51) Int. Cl.
*B62D 5/04* (2006.01)
(52) U.S. Cl.
USPC .............................. 180/446; 180/444; 701/41

(58) Field of Classification Search
USPC ........................ 180/443, 444, 446; 701/41, 42
See application file for complete search history.

(56) References Cited

U.S. PATENT DOCUMENTS

2007/0193819 A1* 8/2007 Iwasa et al. ................... 180/444
2009/0125189 A1* 5/2009 Matsumura et al. ............ 701/42

FOREIGN PATENT DOCUMENTS

| JP | A-08-175406 | 7/1996 |
|----|-------------|--------|
| JP | A-2002-331947 | 11/2002 |
| JP | A-2003-011834 | 1/2003 |
| JP | A-2004-358985 | 12/2004 |
| JP | A-2005-205998 | 8/2005 |
| JP | A-2008-183990 | 8/2008 |
| JP | A-2008-189172 | 8/2008 |
| JP | A-2008-254624 | 10/2008 |

OTHER PUBLICATIONS

Aug. 10, 2010 International Search Report issued in International Patent Application No. PCT/JP2010/060474 (with translation).

\* cited by examiner

*Primary Examiner* — Kevin Hurley
*Assistant Examiner* — Marc A Scharich
(74) *Attorney, Agent, or Firm* — Oliff PLC

(57) ABSTRACT

A controller applies slight rotational torque to a drive gear of a reduction mechanism also in a predetermined range in which a motor does not produce any steering operation assist force. That is, the motor is caused to produce slight rotational torque not enough to drive a driven gear, and the rotational torque direction is reversed under a given condition. Accordingly, a backlash between the drive gear and the driven gear is eliminated.

5 Claims, 11 Drawing Sheets

ELECTRIC POWER STEERING SYSTEM

TECHNICAL FIELD

The invention relates to an electric power steering system that is mounted in a vehicle, such as a motor vehicle, and produces a steering operation assist force using a motor based on the steering torque.

BACKGROUND ART

An electric power steering system is structured such that a steering operation assist force is transferred to a steering mechanism from a motor via a reduction mechanism. The reduction mechanism has a drive gear and a driven gear meshing with it. For smooth meshing, backlashes are created at where the gears mesh with each other. Upon a reverse input into the steering mechanism from the road surface, due to the backlashes, the teeth of the gears may hit each other, causing unpleasant rattling noises. In particular, in a case where the gears are made of metal instead of a synthetic resin, large rattling noises tend to occur. The patent documents 1 and 2 each disclose an electric power steering system incorporating a special elaboration for gears and their peripheries to prevent the occurrence of such large rattling noises.

PRIOR ART DOCUMENTS

Patent Documents

Patent Document 1: Japanese Patent Application Publication No. 2008-189172
Patent Document 2: Japanese Patent Application Publication No. 2008-254624

OUTLINE OF THE INVENTION

It is one of the objects of the invention to provide an electric power steering system that is not complicated in structure but is capable of reducing the occurrence of rattling noises.

MEANS FOR SOLVING THE PROBLEM

An aspect of the invention relates to an electric power steering system having a controller that establishes a state where there is no backlash in one direction between a drive gear and a driven gear of a reduction mechanism, and that performs switching to another state where there is no backlash in the other direction, by reversing the rotational torque direction under a given condition.

MODES FOR CARRYING OUT THE INVENTION

Figure 1:
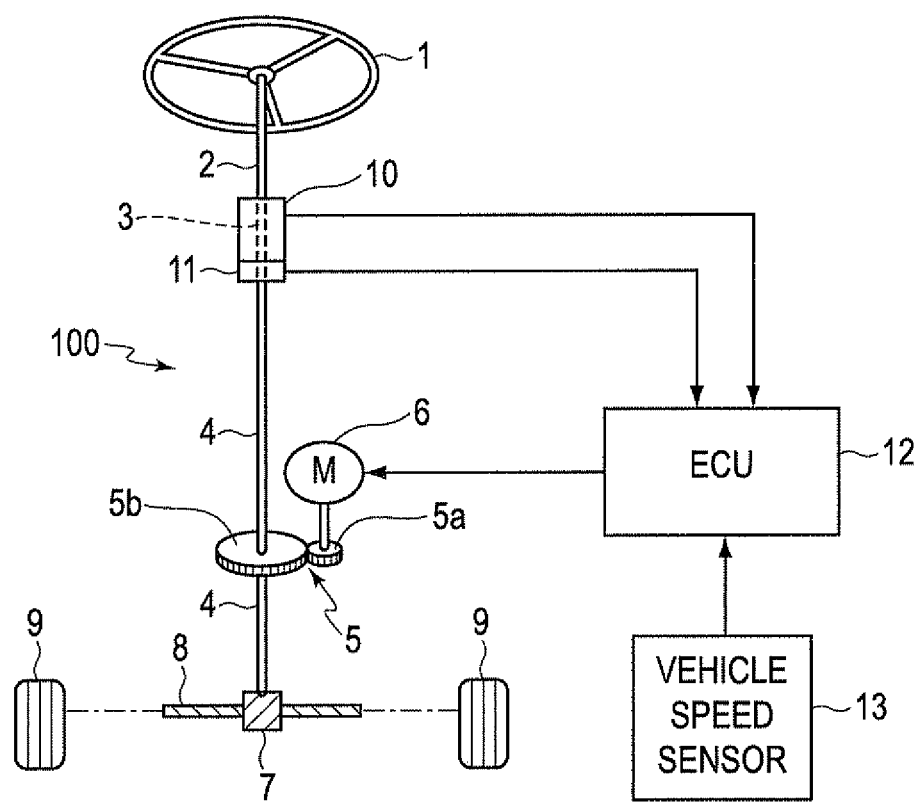
FIG. 1 is a view schematically showing the configuration of an electric power steering system of an example embodiment of the invention.

FIG. 1 is a schematic view illustrating the configuration of an electric power steering system of an example embodiment of the invention. In the drawing, a steering wheel 1 is connected to a first steering shaft 2. The first steering shaft 2 is connected to a second steering shaft 4 via a torsion bar 3. The steering operation assist force produced as a motor 6 rotates is applied to the second steering shaft 4 via a reduction mechanism 5.

The reduction mechanism 5 has a drive gear 5a that is rotationally driven by the motor 6 and a driven gear 5b that is in mesh with the drive gear 5a and applies a steering operation assist force to a steering mechanism. Here, the gears 5a and 5b are both metallic. A pinion 7 is provided at the lower end of the second steering shaft 4. The pinion 7 is in mesh with a rack 8. As the rack 8 moves in its axial direction (i.e., the lateral direction as viewed in the drawing), steered vehicle wheels 9 (typically front wheels) are steered. A steering mechanism 100 has the steering wheel 1, the first steering shaft 2, the torsion bar 3, the second steering shaft 4, the pinion 7, and the rack 8.

The torsion of the torsion bar 3 (i.e., the relative rotational angle difference between the first steering shaft 2 and the second steering shaft 4), that is, the steering torque is detected by a torque detection device 10. The output of the torque detection device 10 is input into an ECU (Electronic Control Unit) 12 that serves as a controller. A steering angle detection device 11 for detecting the steering angle of the second steering shaft 4 is provided, and its output is input into the ECU 12. It is to be noted that "steering angle" represents the output of the steering angle detection device 11 in the following description, and "steering angle" is also the angle corresponding to the steered angle of the steered vehicle wheels 9. Further, vehicle speed signals are input into the ECU 12 from a vehicle speed sensor 13. The ECU 12 drives the motor 6 so as to produce the required steering operation assist force based on the steering torque and the vehicle speed.

Figure 2A:
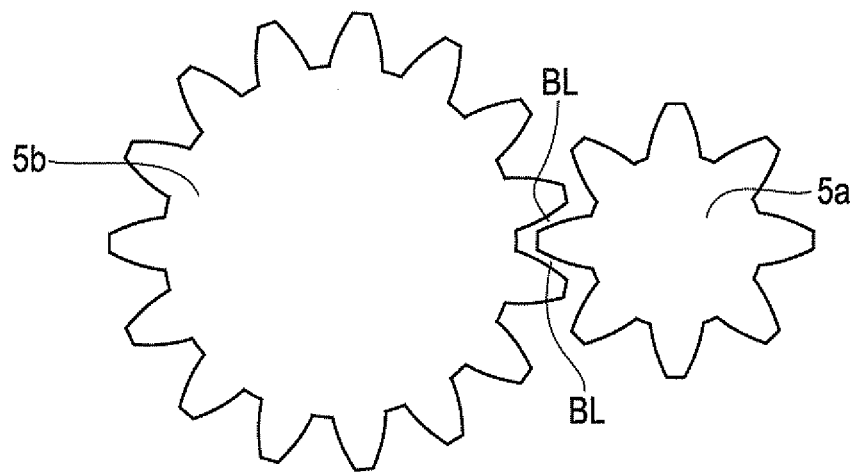
FIG. 2A is a schematic view (conceptual view) of gears of a reduction mechanism, illustrating a state where backlashes BL are present in both directions.
Figure 2B:
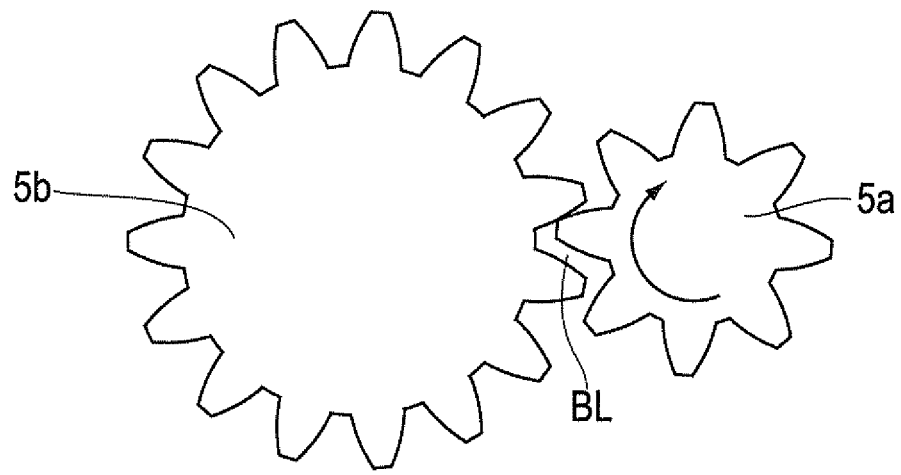
FIG. 2B is a schematic view (conceptual view) of the gears of the reduction mechanism, illustrating a state where the backlash BL in one direction is absent.
Figure 2C:
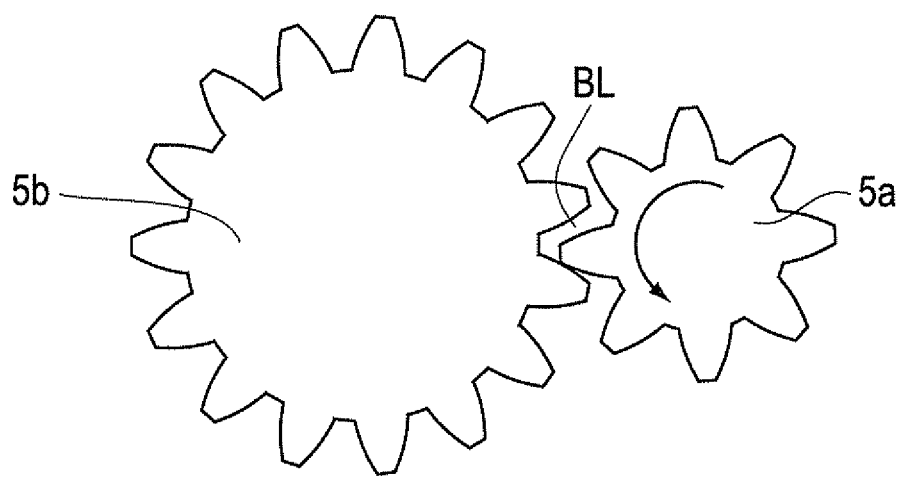
FIG. 2C is a schematic view (conceptual view) of the gears of the reduction mechanism, illustrating a state where the backlash BL in the other direction is absent.

FIGS. 2A to 2C are schematic views (conceptual views) of the gears of the reduction mechanism 5. Note that the diameter, shape, number of teeth, etc. of each drawn gear are not exactly the same as those of the accrual gear. For example, when the vehicle is traveling straight and the driver is not operating the steering wheel, it is often the case that, as shown in FIG. 2A, the teeth of the drive gear 5*a* and the teeth of the driven gear 5*b* are not in contact with each other and backlashes BL are present in both directions of the tooth of the drive gear 5*a*. If a reverse input is transferred to the driven gear 5*b* from the road surface in this state, the tooth of the driven gear 5*b* hits the tooth of the drive gear 5*a*, causing a rattling noise.

In view of the above, when the vehicle is traveling straight, as shown in FIG. 2B, the ECU 12 controls the motor 6 so as to bring the tooth of the drive gear 5*a* into light contact with the tooth of the driven gear 5*b*. Note that "light" represents a degree of contact low enough to prevent the motor 6 from driving the driven gear 5*b*. As shown in FIG. 2B, the ECU 12 controls the motor 6 to produce slight clockwise rotational torque that is not enough to drive the driven gear 5*b*. Therefore, such a state, that is, a state where the backlash in one direction between the drive gear 5*a* and the driven gear 5*b* is absent is established. In this state, the rotational torque of the drive gear 5*a* is smaller than the static frictional torque for moving the driven gear 5*b*).

However, in FIG. 2B, when torque equal to or larger than the static frictional torque acts on the driven gear 5*b* counterclockwise due to some influences, such as those of the road surface, the driven gear 5*b* may slightly move in the same direction. At this time, the drive gear 5*a* accelerates the slight movement of the driven gear 5*b* or rotates clockwise to follow the driven gear 5*b* slightly moving. When this happens, the driven gear 5*b* may gradually rotate and cause the vehicle to deviate to one side. To counter this, the ECU 12 is adapted to execute, under predetermined conditions, control for reversing the direction of the rotational torque of the motor 6 to establish a state where the backlash in the other direction is absent, as shown in FIG. 2C. In the following, example embodiments of the ECU 12 will be described with regard to such a control operation.

First Example Embodiment

The control operation of the ECU 12 of the first example embodiment will be described.

Figure 3:
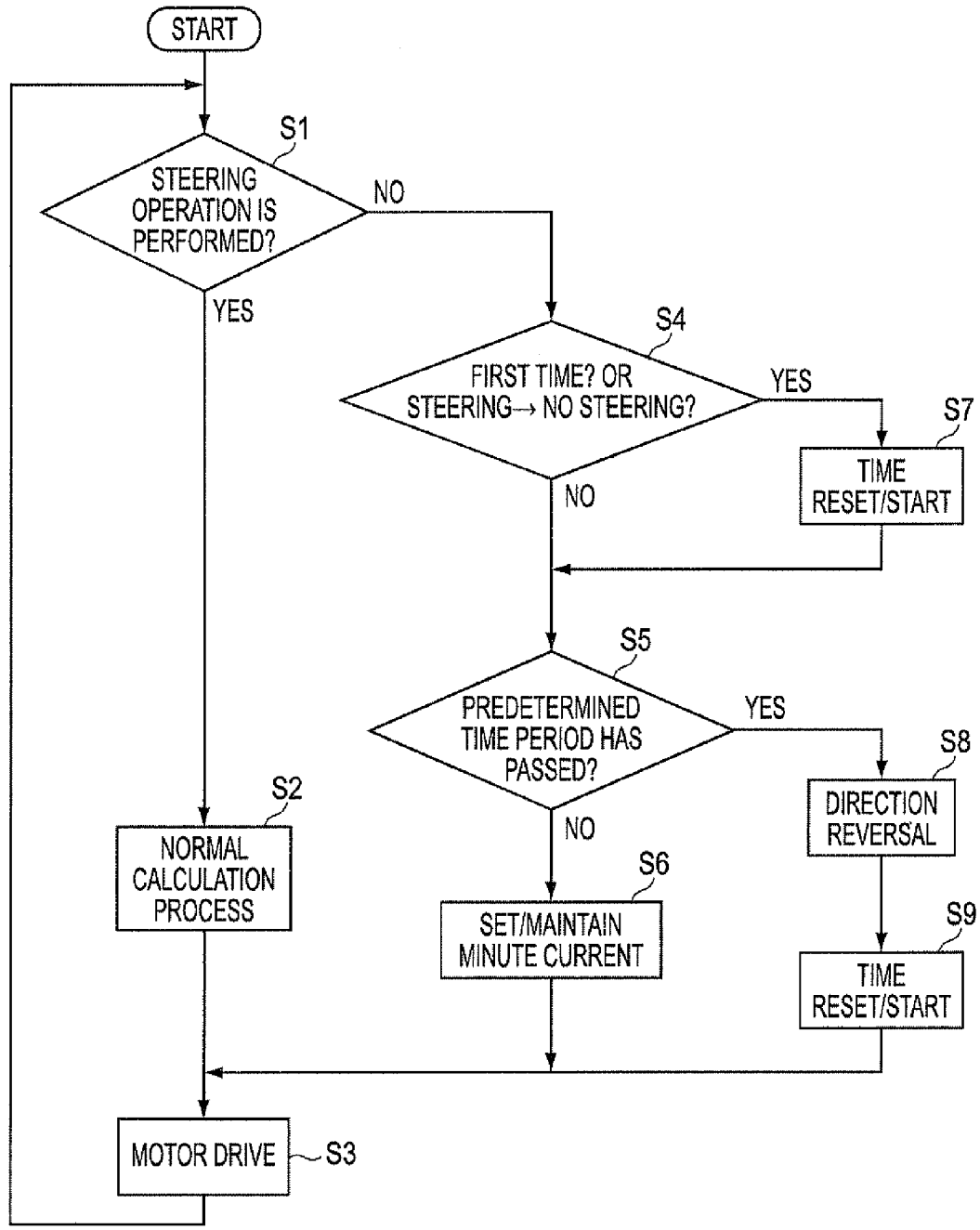
FIG. 3 is a flowchart of control that is related to steering operation and is executed by an ECU in the first example embodiment.

FIG. 3 is a flowchart of control that is related to steering operation and is executed by the ECU 12. Referring to the drawing, after the start of the control, the ECU 12 first determines whether the steering operation is being performed (step S1). More specifically, if the steering torque from the driver, which is based on the output of the torque detection device 10, is within a predetermined no-steering-operation range corresponding to a state where the steering operation is not being performed, the ECU 12 determines that the steering operation is not being performed, and if the steering toque from the driver, which is based on the output of the torque detection device 10, is out of the predetermined no-steering-operation range, the ECU 12 determines that the steering operation is being performed.

Figure 11:
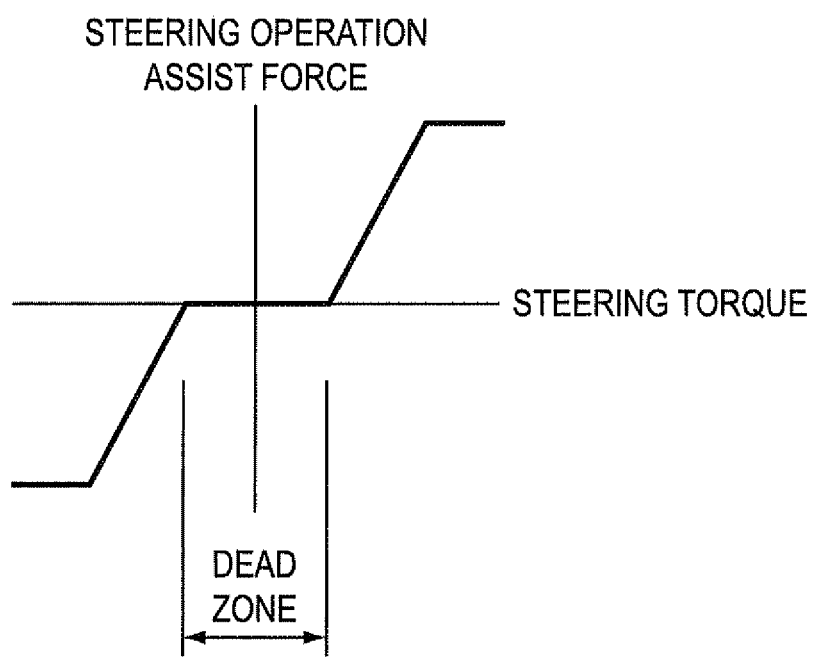
FIG. 11 is a graph illustrating an example relation between a steering torque and a steering operation assist force.

The predetermined no-steering-operation range described above is a range where the motor 6 does not produce any steering operation assist force, that is, a so-called control dead, zone. FIG. 11 is a graph illustrating an example of a relation between the steering torque (the output of the torque detection device 10) and the steering operation assist force. In a dead zone in which the steering torque (the absolute value of the output of the torque detection device 10) is equal to or smaller than a predetermined value, no substantial steering operation assist force for driving the driven gear 5*b* is produced. However, in the dead zone, slight rotational torque not enough to drive the driven gear 5*b* can be produced by the motor.

If it is determined that the driver is operating the steering wheel (step S1: YES), the ECU 12 executes a normal calculation process based on the steering torque and the vehicle speed (step S2), and then drives the motor 6 to produce the required steering operation assist force (step S3). During the steering operation, the assist control through these steps S1 to S3 is repeatedly executed to apply the required steering operation assist force to the pinion 7.

On the other hand, if it is determined that the driver is not operating the steering wheel (step S1: NO), the ECU 12 executes rattling-noise reduction processes (steps S4 to S9), which are different from the normal calculation process. First, in step S4, the ECU 12 determines whether step S4 is executed for the first time, or whether the steering operation was being performed in the last time and it is the first time that a state where the steering operation is not being performed has been established. In this example, it is determined that step 4 is executed for the first time (step S4: YES), and the ECU 12 proceeds to step S7 to start time counting. Next, the ECU 12 determines whether a predetermined time period (e.g., approximately 5 seconds) has passed (step S5). Naturally, "NO" is obtained in the first place, and the ECU 12 sets a minute current (step S6). Meanwhile, in a case where a no-steering-operation state has continued from the last time (step S4: NO) and the predetermined time period has not yet passed (step S5: NO), the ECU 12 maintains the minute current (S6).

It is to be noted that the minute current is current for the motor 6 to produce slight rotational torque not enough to drive the driven gear 5*b*, as mentioned earlier. The ECU 12 drives the motor 6 with the set minute current (step S3) and then returns to step S1. Then, if the no-steering-operation state is still continuing, the ECU 12 executes steps S4, S5, and S6, continuing to drive the motor with the minute current (step S3). Thus, a state where the backlash in one direction between the drive gear 5*a* and the driven gear 5*b* is absent is established (FIG. 2B or FIG. 2C).

If the predetermined time period has passed in the course of repeatedly executing steps S1, S4, S5, S6, and S3 (step S5: YES), the ECU 12 inverses the sign of the minute current to reverse the direction of the rotational torque (step S8). Then, the ECU 12 performs time reset/start (step S9) and drives the motor 6 (step S3), after which the ECU 12 returns to step S1. At this time, if the no-steering-operation state is still continuing, the ECU 12 executes steps S4, S5, and S6, continuing to drive the motor with the minute current (step S3). In this way, a state where the backlash in the other direction, which is opposite to the one direction described above, between the drive gear 5*a* and the driven gear 5*b* is absent is established (FIG. 2C or FIG. 2B).

Thereafter, as long as the no-steering-operation state continues, the direction of the rotational torque of the motor 6 is reversed each time the predetermined time period passes, switching the state cyclically. In a state where there is no backlash in any one direction between the drive gear 5*a* and the driven gear 5*b*, even upon a reverse input from the road surface, the gears are maintained in contact with each other, reducing the occurrence of rattling noises. Further, the state is not simply maintained, but is switched to another state where the backlash in the other direction is absent, by reversing the direction of the rotational torque each time the predetermined time period passes, whereby the driven gear 5b is prevented from gradually moving in one direction.

Upon a shift from a state where the steering operation is not being performed to a state where the steering operation is being performed, the ECU 12 immediately proceeds to step S2 from step S1 and executes the normal calculation process (step S2) to drive the motor 6 (step S3). Then, if a shift from the state where the steering operation is being performed to a state where the steering operation is not being performed occurs again, the ECU 12 proceeds to step S7 from step S4 to perform the time reset/start. Thereafter, the above-described processes are executed in the same manner.

As such, without changing the structure of the reduction mechanism 5, it is possible to reduce rattling noises through the control by the ECU 12 only. That is, it is possible to provide an electric power steering system that is capable of reducing the occurrence of rattling noises without complicating the structure. Further, reducing the occurrence of rattling noises allows the use of metallic gears in the reduction mechanism 5, making it possible to increase the gear strength and reduce the gear size.

Second Example Embodiment

Next, the control operation of the ECU 12 of the second example embodiment will be described.

Figure 4:
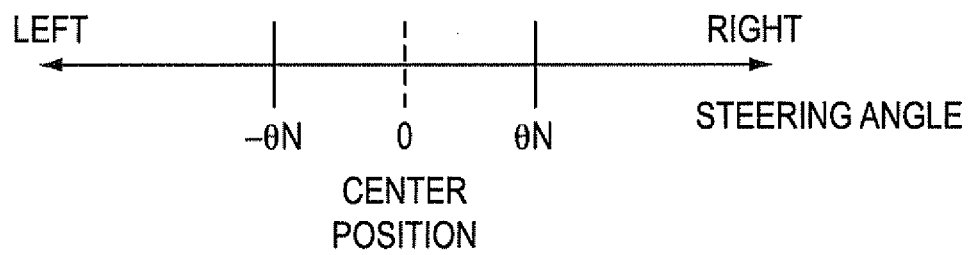
FIG. 4 is a view for explaining how the steering angle changes in a steering torque range specified as a dead zone.
Figure 5:
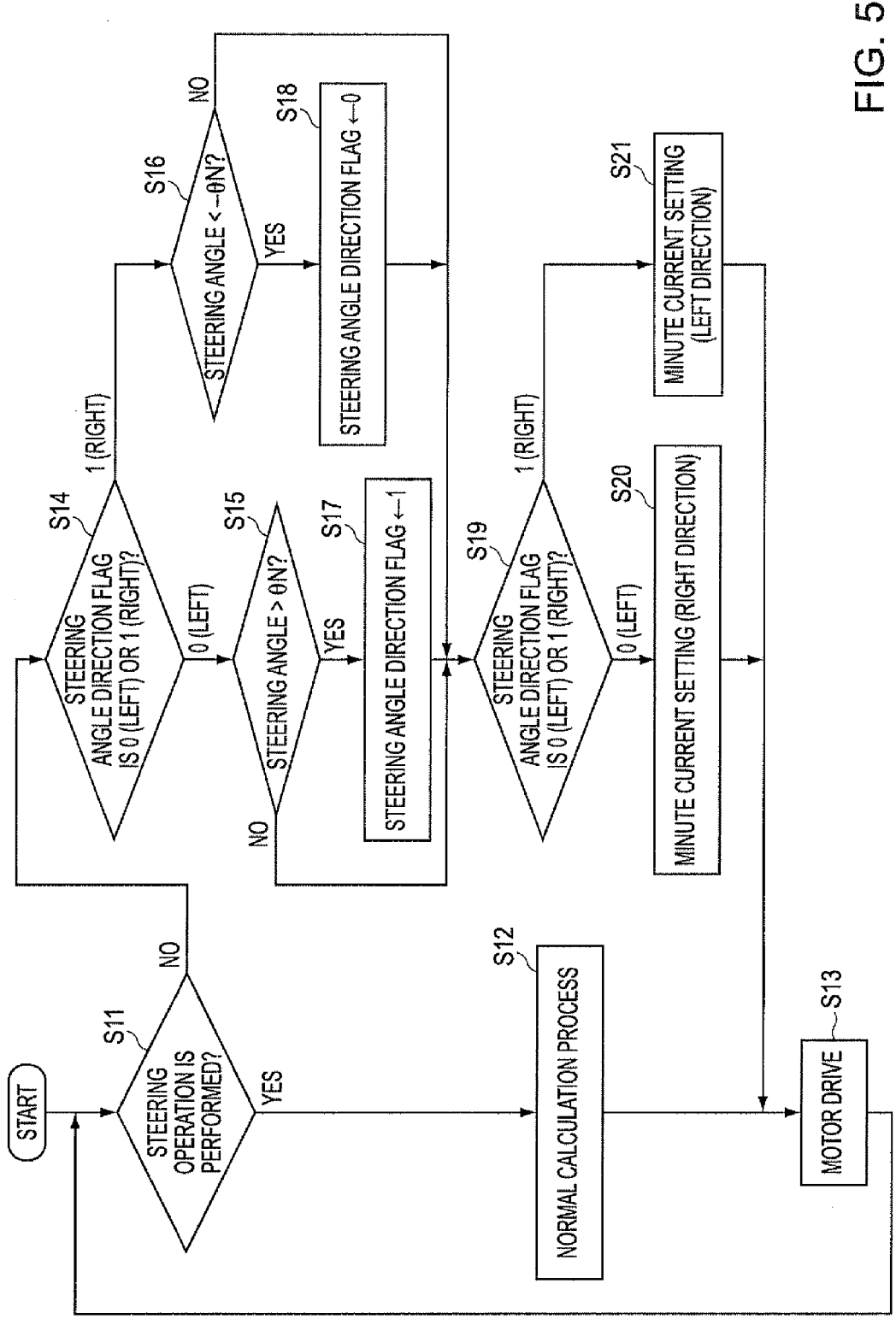
FIG. 5 is a flowchart of control that is related to steering operation and is executed by an ECU in the second example embodiment.

FIG. 4 is a chart for explaining how the steering torque specifying the dead zone shown in FIG. 11, that is, the steering angle (the output value of the steering angle detection device 11) in the range of the amount of torsion of the torsion bar 3 changes. The steering angle on the left side of a center position (0) and the steering angle on the right side of the center position (0) are indicated by opposite signs (positive in the right side and negative in the left side). $\theta N$ and $-\theta N$ are boundary values that are used in the processes described later. FIG. 5 is a flowchart of control that is related to steering operation and executed by the ECU 12. Referring to the drawing, steps S11, S12, and S13 execute, respectively, the same processes in steps S1, S2, and S3 in FIG. 3, and therefore their descriptions will be omitted.

Meanwhile, if it is determined in step S11 that the driver is not performing the steering operation, the ECU 12 executes rattling-noise reduction processes (steps S14 to S21), which are different from normal assist control. First, the ECU 12 determines whether a steering angle direction flag is presently set at 0 (left) or 1 (right) (step S14). The steering angle direction flag is information indicating whether the stored steering angle was in the left region or in the right region immediately before present. Any steering angle obtained when the steering operation is not being performed is a value output from the steering angle detection device 11 when the second steering shaft 4 is rotated by a reverse input from the road surface.

At this time, for example, if the steering angle direction flag is 0 (left), the ECU 12 then determines whether the present steering angle is on the right side of (is larger than) $\theta N$ in FIG. 4 (step S15). Then, if the present steering angle is presently on the right side of $\theta N$, the ECU 12 sets the steering angle direction flag to 1 (right) (step S17). In contrast, if the steering angle is presently $\theta N$ or on the left side thereof, the ECU 12 does not change the steering angle direction flag. Due to these steps S14, S15, and S17, even when the steering angle changes across the center position from the left side, the ECU 12 continues to determine the steering angle direction flag as 0 (left) until the steering angle changes beyond $\theta N$ in the right side, that is, the ECU 12 determines the steering angle direction flag as 1 (right) only after the steering angle has changed to the right side beyond $\theta N$. That is, although the range of 0 to $\theta N$ is in the right region in terms of steering angle, it is a hysteresis region where the ECU 12 determines the steering angle direction flag as being not yet in the right region if the steering angle has been coming from the left side.

On the other hand, if the steering angle direction flag is 1 (right) in step S14, the ECU 12 then determines whether the present steering angle is on the left side of $-\theta N$ in FIG. 4 (step S16). If the present steering angle is on the left side of $-\theta N$, the ECU 12 then sets the steering angle direction flag to 0 (left) (step S18). In contrast, if the steering angle is $-\theta N$ or on the right side thereof, the ECU 12 does not change the steering angle direction flag. Due to these steps S14, S16, and S18, even when the steering angle changes across the center position from the right side, the ECU 12 continues to determine the steering angle direction flag as 1 (right) until the steering angle changes beyond $-\theta N$ in the left side, that is, the ECU 12 determines the steering angle direction flag as 0 (left) only after the steering angle has changed to the left side beyond $-\theta N$. That is, although the range of 0 to $-\theta N$ is on the left side in terms of steering angle, it is a hysteresis region where the ECU 12 determines the steering angle direction flag as being not yet in the 0 (left) region if the steering angle has been coming from the right side.

Next, the ECU 12 determines whether the steering angle direction flag, after subjected to the processes described above, is presently set at 0 (left) or 1 (right) (step S19). If the steering angle direction flag is 0 (left), the ECU 12 sets a minute current in step S20. After setting the minute current such that the direction of the rotational torque obtained from the minute current is the right-turning steering direction, the ECU 12 drives the motor 6 (step S13). In contrast, if the steering angle direction flag is 1 (right) in step S19, the ECU 12 sets a minute current in step S21. After setting the minute current such that the direction of the rotational torque obtained from the minute current is the left-turning steering direction, the ECU 12 drives the motor 6 (step S13).

When the motor 6 produces slight rotational torque using the minute current, a state where the backlash in one direction between the drive gear 5a and the driven gear 5b is absent is established (FIG. 2B or FIG. 2C). Further, if the steering angle changes beyond the hysteresis region from the left side to the right side or vice versa, a state where the backlash in the other direction, opposite to the one direction described above, between the drive gear 5a and the driven gear 5b is absent is established (FIG. 2C or FIG. 2B).

Thereafter, as long as the no-steering-operation state continues, the state continues to be switched by reversing, using the ECU 12, the direction of the rotational torque of the motor 6 according to a change in the steering angle, thus executing control toward the center position.

In the second example embodiment described above, the ECU 12 controls the rotational torque of the motor 6 toward the steering angle center position. The ECU 12 reverses the direction of the rotational torque in response to a change in the steering angle from a region regarded as one side among the left and right sides to a value in the other side beyond the boundary value. As such, the ECU 12 prevents the driven gear 5b from gradually rotating away from the steering angle center position, and therefore the driven gear 5b can be always controlled toward the center position.

As such, although the structure of the reduction mechanism 5 is not changed, it is possible to reduce the occurrence of rattling noises through the control by the ECU 12 only. That is, it is possible to provide an electric power steering system that is capable of reducing the occurrence of rattling noises without complicating the structure. Further, reducing the occurrence of rattling noises allows the use of metallic gears in the reduction mechanism, making it possible to increase the gear strength and reduce the gear size.

Further, the above-described region regarded as one of the left and right regions includes, in addition to the region on the one side, the predetermined hysteresis region extending from the center position toward the other side upon a continuous shift from a past state where the steering angle was in the one of the left and right regions (i.e., a shift from the left to the right, or a shift from the right to the left). With the hysteresis region thus set, the rotational torque direction can be prevented from being frequently reversed in the vicinity of the center position, that is, hunting can be prevented.

Third Example Embodiment

Next, the control operation of the ECU 12 of the third example embodiment will be described.

Figure 6:
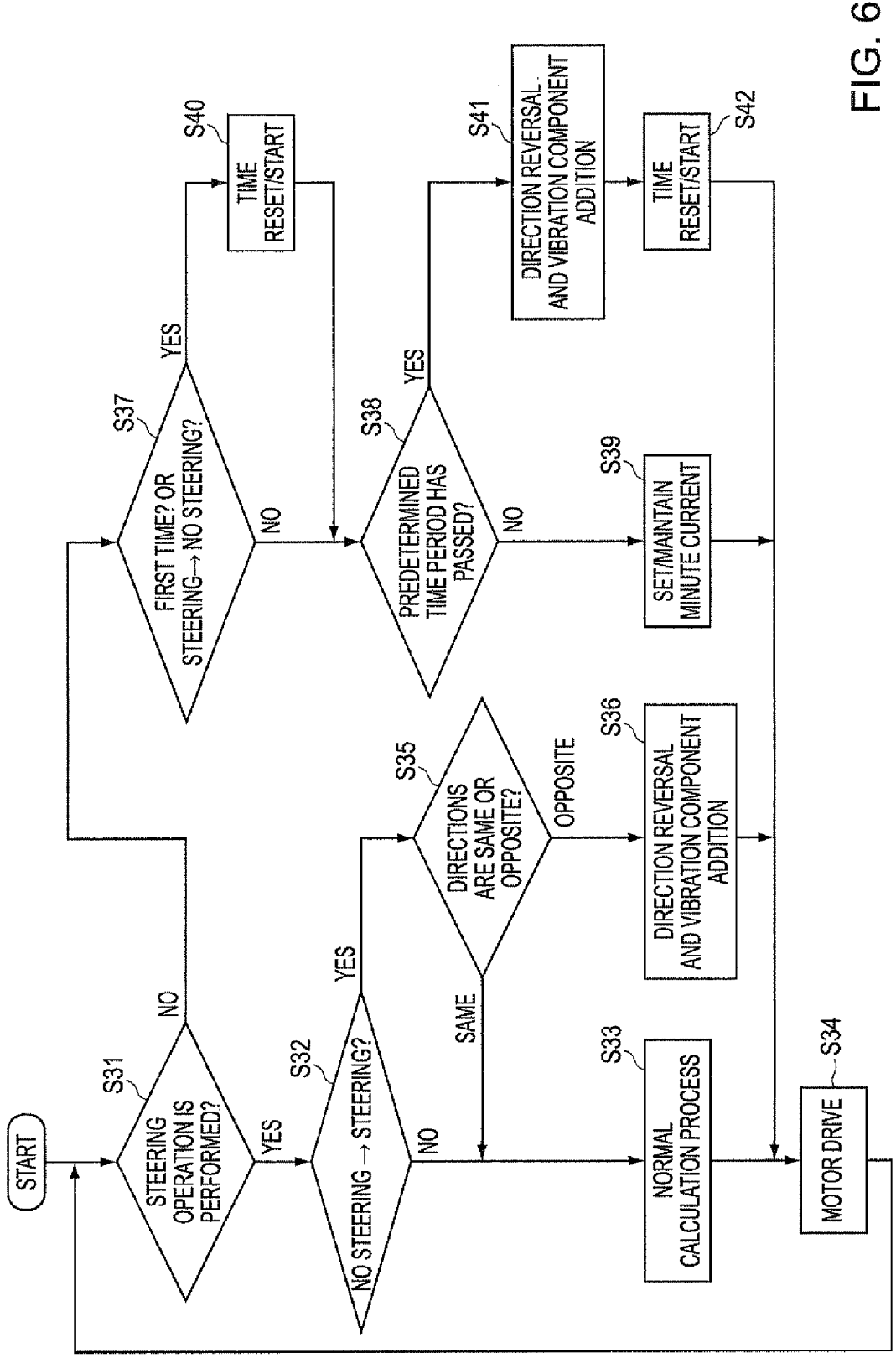
FIG. 6 is a flowchart of control that is related to steering operation and is executed by an ECU in the third example embodiment.

FIG. 6 is a flowchart of control that is related to steering operation and is executed by the ECU 12. Referring to the drawing, after the start of control, the ECU 12 first determines whether the steering operation is being performed (step S31). More specifically, based on the output of the torque detection device 10, the ECU 12 determines that the steering operation is not being performed if the steering torque from the driver is within a predetermined no-steering-operation range, and determines that the steering operation is being performed if the steering torque from the driver is out of the predetermined no-steering-operation range.

If it is determined that the driver is performing the steering operation, the ECU 12 then determines whether there has been a shift from a no-steering operation state immediately before present to a state where the steering operation is being operated (step S32). If the steering operation was being performed immediately before present (step S32: NO), the ECU 12 executes a normal calculation process based on the steering torque and the vehicle speed (step S33), and then drives the motor 6 to produce the required steering operation assist force (step S34). During the steering operation, the assist control through these steps S31 to S34 is repeatedly executed to apply the required steering operation assist force to the pinion 7.

(Rattling Noise Reduction while the Steering Operation is not being Performed)

On the other hand, if it is determined in step 31 that the driver is not performing the steering operation, the ECU 12 executes rattling-noise reduction processes (steps S37 to S42), which are different from the normal assist control. First, in step S37, the ECU 12 determines whether step S37 is executed for the first time, or whether the steering operation was being performed in the last time and it is the first time that a state where the steering operation is not being performed has been established. In this example, it is determined that step 37 is executed for the first time (step S37: YES), and the ECU 12 proceeds to step S40 to start time counting. Next, the ECU 12 determines whether a predetermined time period (e.g., 5 seconds or so) has passed (step S38). Naturally, "NO" is obtained in the first place, and the ECU 12 sets a minute current (step S39). Meanwhile, in a case where a no-steering-operation state has continued from the last time (step S37: NO) and the predetermined time period has not yet passed (step S38: NO), the ECU 12 maintains the minute current (S39).

Meanwhile, when the minute current is I1, a drive current I_obj for an instruction to the motor 6 is expressed as I_obj=I1. The ECU 12 drives the motor 6 with this current (step S34) and then returns to step S31. At this time, if the no-steering-operation state is not still continuing, the ECU 12 executes steps S37, S38, and S39, continuing to drive the motor with the minute current (step S34). Thus, a state where the backlash in one direction between the drive gear 5a and the driven gear 5b is absent is established (FIG. 2B or FIG. 2C).

When the predetermined time period has passed in the course of repeatedly executing steps 31, S37, S38, S39, and S34 (step S38: YES), the ECU 12 reverses the direction of the rotational torque by inversing the sign of the minute current and adds a vibration component (step S41). More specifically, I1 is replaced with −I1. The frequency of a vibration component I2_f is, for example, 40 Hz. That is, as a result of the replacement of I1=−I1, the drive current I_obj at this time is expressed as below.

$$I\_obj = I1 + I2\_f \quad (1)$$

Note that example values (effective values) of I1 and I2 are 0.9 A and 0.4 A, respectively.

Then, the ECU 12 performs time reset/start (step S42) and then drives the motor 6 (step S34). In this way, the direction of the rotational torque of the motor 6 is reversed, so that a state where the backlash in the other direction, which is opposite to the one direction described above, between the drive gear 5a and the driven gear 5b is absent is established (FIG. 2C or FIG. 2B). Further, due to the addition of the vibration component I2_f, the tooth of the drive gear 5a is vibrating when it conies into contact with the tooth of the driven gear 5b. Therefore, the first gear-to-gear contact noise that occurs as the drive gear 5a rotates in reverse from the side where there is no backlash to the side where there is a backlash is suppressed by the vibration component.

Thereafter, if the no-steering-operation state is still continuing, the ECU 12 executes steps S37, S38, and S39. In step S39, the drive current is set to I_obj=I1, that is, the vibration component is removed from the right side of the equation (1) indicated above. Thereafter, as long as the no-steering-operation state continues, the motor continues to be driven with I_obj=I1 (step S34). As such, the state where the backlash in the other direction, which is opposite to the one direction described above, between the drive gear 5a and the driven gear 5b is absent can be maintained (FIG. 2C or FIG. 2B).

Thereafter, as long as the no-steering-operation state continues, the direction of the rotational torque of the motor 6 is reversed each time the predetermined time period passes, switching the state cyclically. As in the first example embodiment, thus, it is possible to reduce the occurrence of rattling noises and prevent the driven gear 5b from gradually moving in one direction.

(Rattling Noise Reduction Upon a Shift from a State where the Steering Operation is not being Performed to a State where the Steering Operation is being Performed)

Meanwhile, in this example embodiment, the rattling noise reduction processes (steps S32, S35, and S36) are executed also upon a shift from a state where the steering operation is not being performed to a state where the steering operation is being performed. That is, upon a shift from a state where the steering operation is not being performed to a state where the steering operation is being performed, the ECU 12 proceeds to step S32 from step S31, and determines "YES" and then executes step S35. In step S35, the ECU 12 determines whether the direction in which the tooth of the drive gear 5a is abutted on the tooth of the driven gear 5b (pressing direction) is the same as or opposite to the direction of the steering torque. This determination can be performed, for example, based on the sign of (T×I_obj), which is the value obtained by multiplying a steering torque T (the output value of the torque detection device 10) by the last drive current I_obj for the motor 6. More specifically, the sign of (T×I_obj) is positive when the pressing direction and the steering torque direction are the same, while the sign of (T×I_obj) is negative when they are opposite to each other.

Thus, if (T×I_obj)≥0, the ECU 12 determines that the pressing direction and the steering torque direction are the same, and then proceeds to step S33 to execute the normal calculation process. On the other hand, if (T×I_obj)<0, the ECU 12 determines that the pressing direction and the steering torque direction are opposite to each other and then executes step S36. The process in step S36 is identical to the above-described process in step S41. Therefore, the first gear-to-gear contact noise that occurs when the driven gear 5*b* is driven by the drive gear 5*a* rotating, as the steering operation is performed by the driver, in reverse from the side where there is no backlash to the side where there is a backlash is suppressed by the vibration component. It is to be note that even if the steering operation is further performed, "NO" is obtained in step S32, that is, as a result, the process in step S36 is executed only once.

As such, although the structure of the reduction mechanism 5 is not changed, it is possible to reduce the occurrence of rattling noises through the control by the ECU 12 only. That is, it is possible to provide an electric power steering system that is capable of reducing the occurrence of rattling noises without complicating the structure. Further, reducing the occurrence of rattling noises allows the use of metallic gears in the reduction mechanism, making it possible to increase the gear strength and reduce the gear size. In addition, the first gear-to-gear contact noise that occurs as the drive gear 5*a* rotates in reverse from the side where there is no backlash to the side where there is a backlash is suppressed by the vibration component.

Figure 7A:
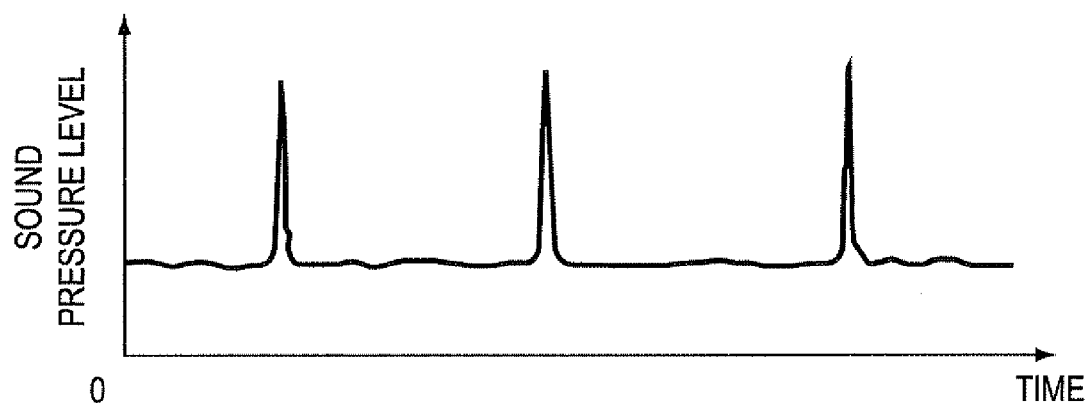
FIG. 7A is a graph illustrating the level of sound pressures that occur when a tooth of a drive gear hits a tooth of a driven gear in a state where a vibration component is not added.
Figure 7B:
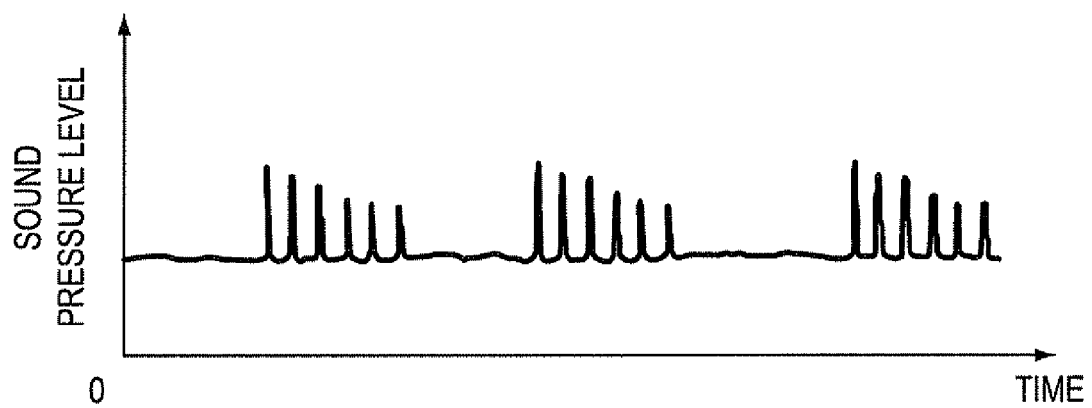
FIG. 7B is a graph illustrating the level of sound pressures that occur when a tooth of the drive gear hits a tooth of the driven gear in a state where a vibration component is added.

FIG. 7A is a graph indicating the level of sound pressure that occurs when the tooth of the drive gear 5*a* hits the tooth of the driven gear 5*b* in a case where a vibration component, such as the one described above, is not added. On the other hand, FIG. 7B is a graph indicating the level of sound pressure that occurs when the tooth of the drive gear 5*a* hits the tooth of the driven gear 5*b* in a case where a vibration component, such as the one described above, is added. A comparison between FIG. 7A and FIG. 7B makes it clear that when a vibration component is added, although a cluster of noises occurs, the peak values are reduced significantly, whereby the contact noise suppression is achieved. In the meantime, with regard to the vibration frequency, if the frequency is too low, the contact noise suppression effect is diminished, and if the frequency is too high, the operation noise of the motor 6 increases. For this reason, it is preparedly set to approximately 40 Hz, as a value that is neither too low nor too high.

Fourth Example Embodiment

Figure 8A:
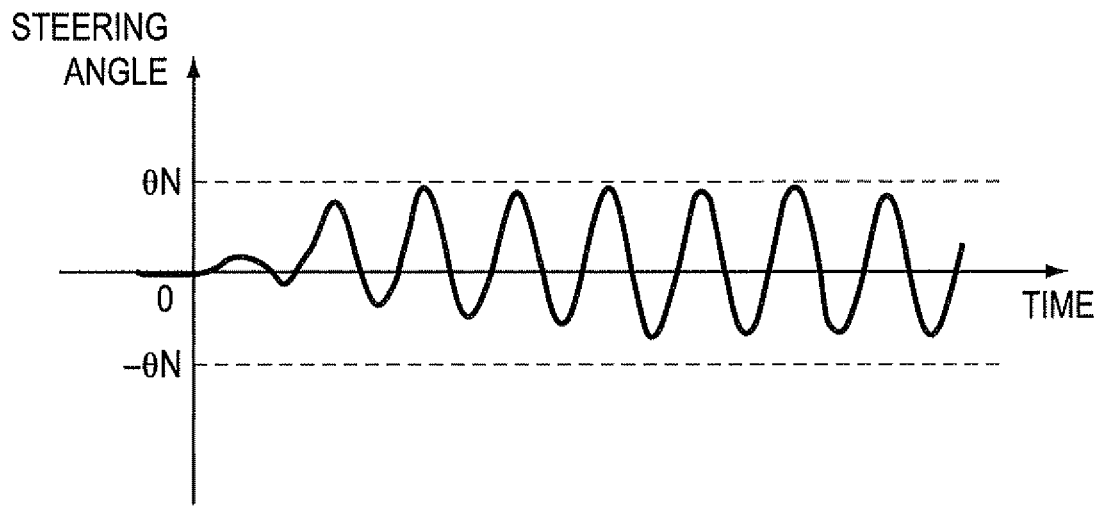
FIG. 8A is a graph illustrating an example steering angle transition.
Figure 8B:
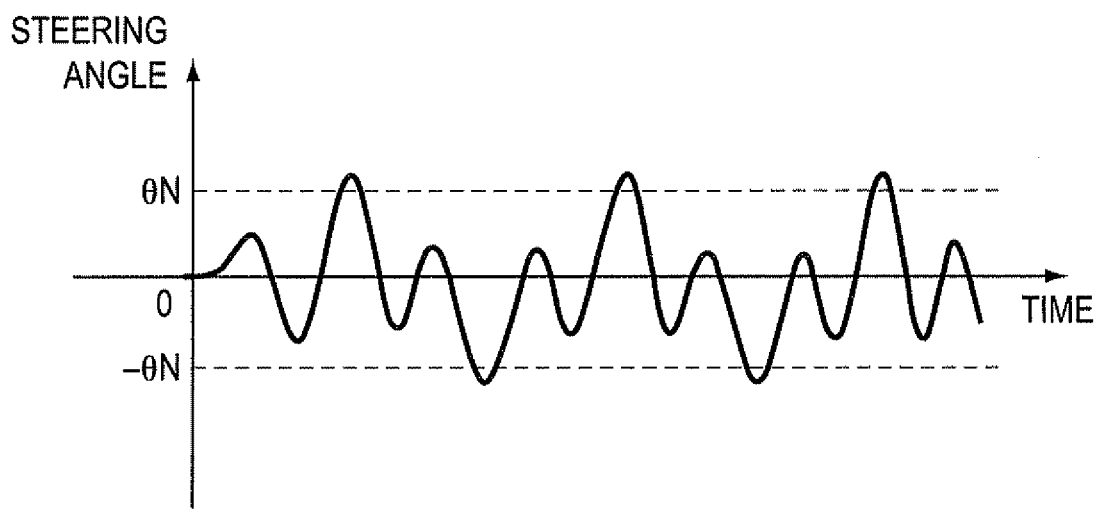
FIG. 8B is a graph illustrating an example steering angle transition.

Next, the control operation of the ECU 12 of the fourth example embodiment will be described. FIGS. 8A and 8B are graphs each illustrating an example transition of the steering angle. For example, in a situation where the control operation of the second example embodiment is executed, the switching through the reversal of the rotational torque is not performed even in a case where the steering angle changes within the hysteresis region (−θN to θN) as shown in FIG. 5A. In contrast, the switching is frequently performed in a case where the steering angle frequently changes from the left side to the right side or vice versa beyond the boundary value of the hysteresis region, shown in FIG. 8B.

Steering angle transitions, such as those in FIGS. 5A and 8B, tend to occur during traveling on a rough road. In the case of FIG. 8B, the switching is frequently performed as compared to, for example, a case where the rotational torque direction is reversed cyclically, for example, every five minutes or so, as in the first example embodiment. Further, in the case of FIG. 8A, there is a possibility that the switching is not performed and thus the vehicle continuously deviate to the left or right side of the road. To counter this, this example embodiment employs a concept that a steering angle is added up (integrated) and performs the control operation based on it.

Figure 9:
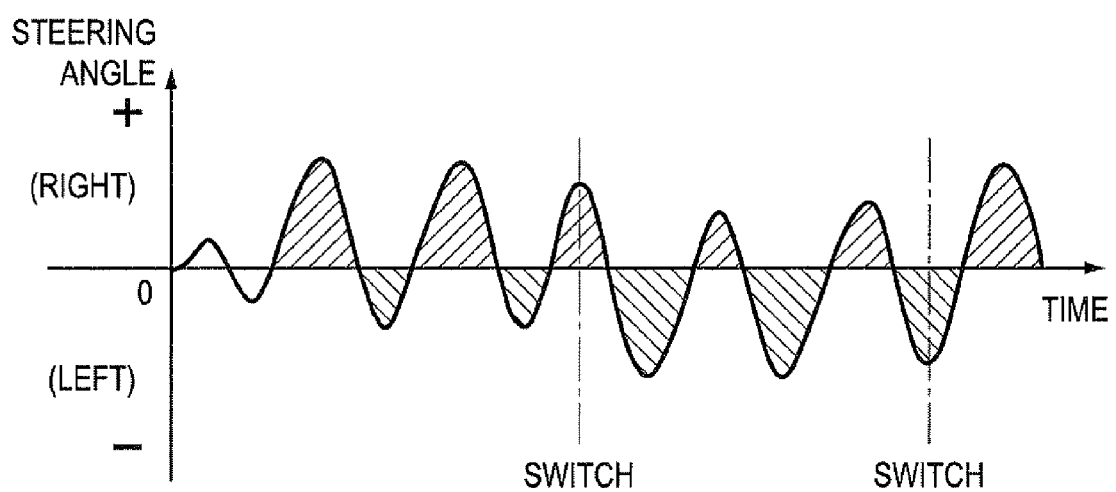
FIG. 9 is a graph illustrating a concept of integration corresponding to a steering angle transition.

FIG. 9 is a graph illustrating, by way of example, a concept of integration for a steering angle transition. The steering angle is integrated, that is, the hatched areas in the steering angle positive side (right side) of FIG. 9 are integrated, and the hatched areas in the steering angle negative side (left side) of FIG. 9 are integrated. Then, when the integral value reaches a set value, the switching by the reversal of the rotational torque direction is performed.

Figure 10:
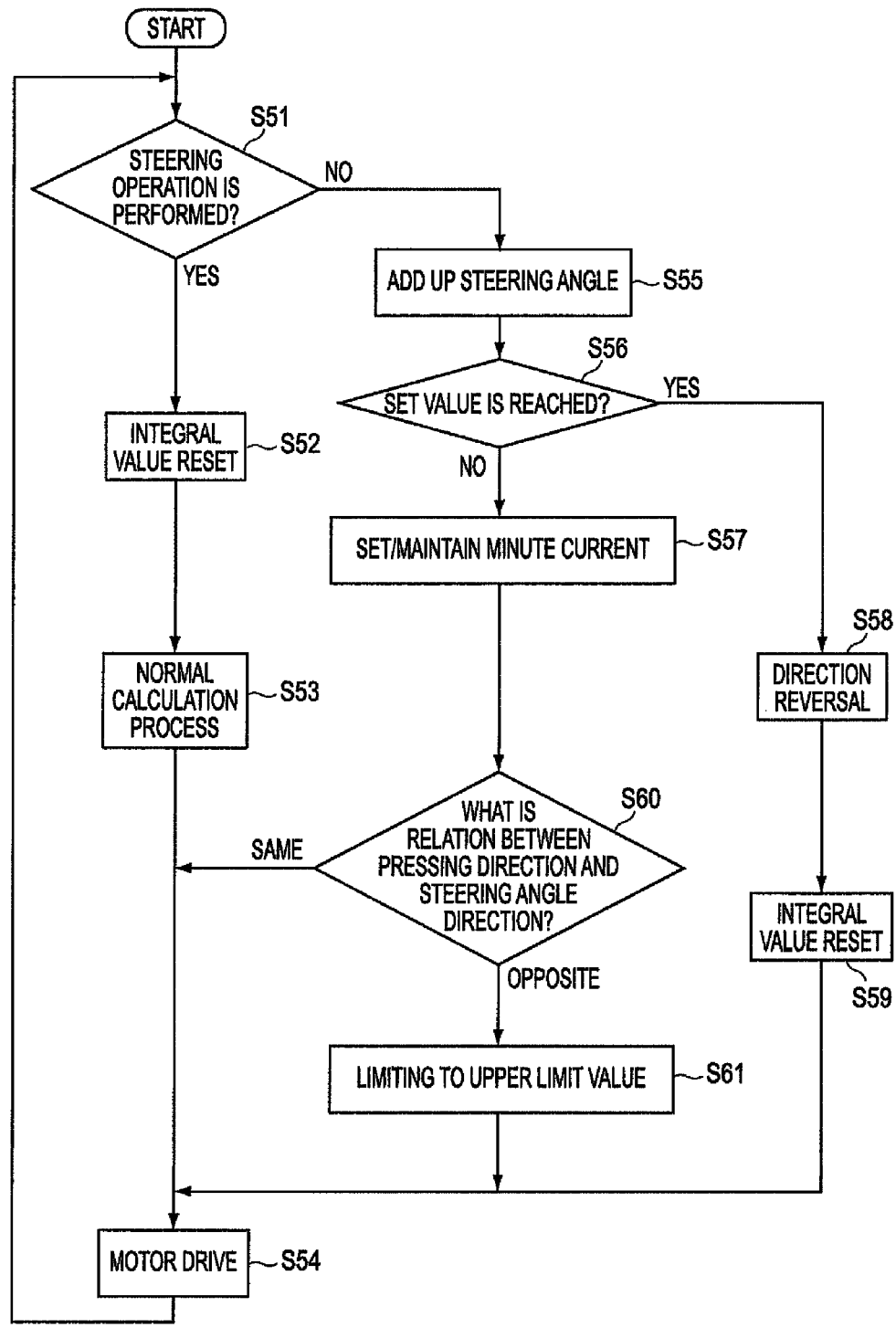
FIG. 10 is a flowchart of control that is related to steering operation and is executed by an ECU in the fourth example embodiment.

FIG. 10 is a flowchart of control that is related to steering operation and is executed by the ECU 12. Referring to the drawing, after the start of control, the ECU 12 first determines whether the steering operation is being performed (step S51). More specifically, based on the output of the torque detection device 10, the ECU 12 determines that the steering operation is not being performed if the steering torque from the driver is within a predetermined no-steering-operation range, and determines that the steering operation is being performed if the steering torque from the driver is out of the predetermined no-steering-operation range.

If it is determined that the driver is performing the steering operation (step S51: YES), the ECU 12 executes a process of resetting the integral value (step S52), then executes a normal calculation process based on the steering torque and the vehicle speed (step S53), and then drives the motor 6 to produce the required steering operation assist force (step S54). During the steering operation, the assist control through these steps S51 to S54 is repeatedly executed to apply the required steering operation assist force to the pinion 7.

On the other hand, if it is determined that the driver is not performing the steering operation (step S51: NO), the ECU 12 executes rattling noise minimization processes (steps S55 to S61), which are different from the normal assist control. First, the ECU 12 adds up the steering angle (step S55). More specifically, the ECU 12 obtains an integral value S=Σθ(t) by adding up a present steering angle θ(t) based on the output of the steering angle detection device 11. Note that t represents the time at which step S55 is executed, and the integral value S of the steering angle represents the areas in FIG. 9 because the processing by the ECU 12 is faster than the change in the steering angle. The ECU 12 obtains an integral value Sp of the positive side for the steering angle and an integral value Sm for the negative side of the steering angle.

Subsequently, the ECU 12 determines whether the integral value Sp or Sm has reached the set value (step S56). If the integral value Sp or Sm has not yet reached the set value (step S56: NO), the ECU 12 sets or maintains a minute current (sets the minute current first, and maintains it from the second cycle) (step S57). Then, the ECU 12 determines whether the direction in which the tooth of the drive gear 5*a* is pressed against the tooth of the driven gear 5*b* using the minute current thus set is the same as or opposite to the steering angle direction corresponding to the larger of the steering angle integral value for the left side and that for the right side (step S60). If they are the same, the ECU 12 proceeds to step S54. If they are opposite to each other, the ECU 12 limits the integral value (the larger one) to a predetermined upper limit value (step S61). That is, when the integral value is smaller than the upper limit value, the integral value is unchanged, and when the integral value is equal to or larger than the upper limit value, the integral value is forcibly set to the upper limit value to prevent the integral value from becoming larger than the upper limit value.

Then, the ECU 12 drives the motor 6 with the set minute current (step S54) and then returns to step S51. At this time, if the no-steering-operation state is still continuing, the ECU 12 executes steps S55, S56, and S57, continuing to drive the motor with the minute current (step S54). Thus, a state where the backlash in one direction between the drive gear 5a and the driven gear 5b is absent is established (FIG. 2B or FIG. 2C).

When the integral value Sp or Sm corresponding to the direction in which the tooth of the drive gear 5a is presently pressed against the tooth of the driven gear 5b reaches the set value in the course of repeatedly executing steps S51, S55, S56, S57, S60, and S54 (step S56: YES), the ECU 12 reverses the direction of the rotational torque by inversing the sign of the minute current (step S58). Then, the ECU 12 resets the integral value Sp or Sm (step S59), then drives the motor 6 (step S54), and then returns to step S51. At this time, if the no-steering-operation state is still continuing, the ECU 12 executes steps S55, S56, and S57, continuing to drive the motor with the minute current (step S54). In this way, a state where the backlash in the other direction, which is opposite to the one direction described above, between the drive gear 5a and the driven gear 5b is absent is established (FIG. 2C or FIG. 2B).

Thereafter, as long as the no-steering-operation state continues, the direction of the rotational torque of the motor 6 is reversed each time the integral value Sp or Sm corresponding to the direction in which the tooth of the drive gear 5a is pressed reaches the set value. Thus, the backlash-free state is switched between one direction and the other direction. Accordingly, it is possible to reduce the occurrence of rattling noises and prevent the driven gear 5b from gradually moving in one direction.

Upon a shift from a state where the steering operation is not being performed to a state where the steering operation is being performed, the ECU 12 immediately proceeds to step S52 from step S51, and after resetting the integral value, the ECU 12 executes the normal calculation process (step S53), and then drives the motor 6 (step S54). If a shift from a state where the steering operation is being performed to a state where the steering operation is not being performed occurs later, the ECU 12 proceeds to step S55 from step S51 to start adding up the steering angle. Thereafter, the foregoing processes are executed in the same manner.

Meanwhile, if the road surface is slanted (slanted in the lateral direction of the road), there is caused a phenomenon in which the steering angle is integrated in a direction opposite to the direction in which the drive gear 5a is pressed. In this case, even when the value integrated in the opposite direction reaches the set value, since this direction is different from the pressing direction, the direction reversal should not be performed for that. In this case, therefore, as described above, the integral value is limited to the upper limit value (step S61). That is, the direction reversal is not performed as long as a situation continues where the pressing direction is opposite to the steering angle direction corresponding to the larger of the steering angle integral value for the left side and that for the right side.

As such, although the structure of the reduction mechanism 5 is not changed, it is possible to minimize rattling noises through the control by the ECU 12 only. That is, it is possible to provide an electric power steering system that is capable of reducing the occurrence of rattling noises without complicating the structure. Further, reducing the occurrence of rattling noises allows the use of metallic gears in the reduction mechanism 5, making it possible to increase the gear strength and reduce the gear size. In addition, since the rotational torque direction is reversed when the steering angle integral value reaches the set value, it is possible to prevent the phenomenon in which the actual vehicle deviates to the left or right from the direction in which the driver intends to drive the vehicle.

(Others)

The control operations in the foregoing example embodiments are different in the condition on which the rotational torque direction reversal is performed. That is, the condition is time passage in the first and third example embodiments, the condition is that the steering angle changes from the left to right or vice versa across the center position in the second example embodiment, and the condition is that the steering angle integral value reaches the set value in the fourth example embodiment. These conditions may be combined as needed. In this case, the direction reversal may be performed under the condition first satisfied. Further, the vibration component addition in the third example embodiment may be applied also to the second and fourth example embodiments.

The structure in FIG. 1 is a pinion-assist structure in which the steering operation assist force is applied to the second steering shaft 4 and the pinion 7 from the reduction mechanism 5. However, controls that are identical or similar to those described above may be applied also to rack-assist structures in which the steering operation assist force is applied to the rack 8 from the reduction mechanism 5.

DESCRIPTION OF REFERENCE NUMERALS

5: REDUCTION MECHANISM, 5a: DRIVE GEAR, 5b: DRIVEN GEAR, 6: MOTOR, 11: STEERING ANGLE DETECTION DEVICE, 12: ECU (CONTROL UNIT), 100: STEERING MECHANISM, BL: BACKLASH

The invention claimed is:

1. An electric power steering system comprising:
   a steering mechanism;
   a motor that applies a steering operation assist force to the steering mechanism;
   a reduction mechanism that has a drive gear rotationally driven by the motor and a driven gear attached at the steering mechanism and meshing with the drive gear;
   a controller that controls the motor; and
   a steering angle detector that detects a steering angle, wherein
   in a predetermined no-steering-operation range in which the motor does not apply the steering operation assist force, the controller causes the motor to:
      apply a slight rotational torque in a first rotational direction, the slight rotation force is not sufficient to drive the driven gear;
      switch a direction of the slight rotational torque from the first rotational direction to a second rotational direction under a given condition; and
      reverse the direction of the slight rotational torque between the first rotational direction and the second rotational direction each time an integral value of steering angles detected by the steering angle detector in the predetermined range reaches a set value.

2. The electric power steering system according to claim 1, wherein the controller:

causes the motor to apply a slight rotational torque in the first rotational direction which is a direction toward a center steering angle position detected by the steering angle detector, and reverses the direction of the slight rotational torque to the second rotational direction when the detected steering angle changes from a steering angle which is in a first region defining steering angles on a first side of the center steering angle position to a steering angle which is in a second region defining steering angles on a second side of the center steering position and which is beyond a second boundary value.

3. The electric power steering system according to claim 2, wherein the first region and the second region include a part of a predetermined hysteresis region extending from the center steering angle position toward the second boundary value in the second region and a first boundary value in the first region.

4. The electric power steering system according to claim 1, wherein the controller incorporates a vibration component into a drive current for the motor when reversing the direction of the slight rotational torque and when starting a steering operation assist operation accompanied by a reversal of the direction of a rotational torque.

5. An electric power steering system comprising:
a steering mechanism;
a motor that applies a steering operation assist force to the steering mechanism;
a reduction mechanism that has a drive gear rotationally driven by the motor and a driven gear attached at the steering mechanism and meshing with the drive gear;
a controller that controls the motor; and
a steering angle detector that detects a steering angle, wherein
in a predetermined no-steering-operation range in which the motor does not apply the steering operation assist force, the controller causes the motor to:
apply a slight rotational torque in a first rotational direction, the slight rotation force is not sufficient to drive the driven gear;
switch a direction of the slight rotational torque from the first rotational direction to a second rotational direction under a given condition;
reverse the direction of the slight rotational torque between the first rotational direction and the second rotational direction each time a predetermined time period passes while the slight rotational torque is applied, so that the reversing is performed cyclically; and
reverse the direction of the slight rotational torque between the first rotational direction and the second rotational direction each time an integral value of steering angles detected by the steering angle detector in the predetermined range reaches a set value.

* * * * *